United States Patent [19]

Belter

[11] Patent Number: 4,813,913

[45] Date of Patent: Mar. 21, 1989

[54] PROTECTIVE BOOT ASSEMBLY

[75] Inventor: Jerome G. Belter, Mount Prospect, Ill.

[73] Assignee: Dana Corporation, Toledo, Ohio

[21] Appl. No.: 393,854

[22] Filed: Jun. 30, 1982

[51] Int. Cl.⁴ .............................................. F16D 3/84
[52] U.S. Cl. ............................. 464/175; 277/212 FB
[58] Field of Search ...................... 24/205 R, 205.1 R; 277/212 FB; 464/173, 175

[56] References Cited

U.S. PATENT DOCUMENTS

| | | | |
|---|---|---|---|
| 1,434,610 | 11/1922 | Gunn | 464/173 X |
| 1,585,189 | 5/1926 | Emerson | 464/173 X |
| 1,982,445 | 11/1934 | Miquelon | 464/173 |
| 2,025,635 | 12/1935 | Bishoff | 464/173 |
| 2,085,284 | 6/1937 | Wollner | 464/173 |
| 2,134,358 | 10/1938 | Crossland | 464/173 |
| 2,308,073 | 1/1943 | Hagerty | 464/175 |
| 2,378,046 | 6/1945 | Stergis | 464/175 X |
| 3,026,589 | 3/1962 | Sperry et al. | 24/205.1 R |

FOREIGN PATENT DOCUMENTS

| | | | |
|---|---|---|---|
| 1245236 | 7/1967 | Fed. Rep. of Germany | 277/212 FB |
| 2010988 | 7/1979 | United Kingdom | 277/212 FB |

Primary Examiner—Daniel P. Stodola
Attorney, Agent, or Firm—Frank B. McDonald

[57] ABSTRACT

A protective boot assembly 10 includes a flexible body 12 having at least one corrugation 16 positioned traversely to a longitudinal axis 14 of the body, whereby a coupling member for a pair of angularly disposed rotatable shafts encased therein may be continuously protected from foreign elements. The body includes an axial opening 22 which defines two opposed axially extending surfaces 24,26 which retain and support a sliding fastener 28 which provides a closure system.

In a preferred embodiment, the opposed surfaces are each bounded by a protective lip 34,36 whereby closure of the opening is effected by the combination of the fastener slider mechanism and the protective lips. The fastener mechanism and the protective lips together define an axially extending cavity 38 which upon closure is filled with a flexible sealant material.

4 Claims, 2 Drawing Sheets

PROTECTIVE BOOT ASSEMBLY

BACKGROUND OF THE INVENTION

This invention relates to protective boot assemblies for coupling members of rotatable shafts disposed angularly toward one another. The coupling members may be, for example, universal joints. More particularly, the invention relates to flexible protective coverings for such coupling members, especially of the type which include axially disposed openings and associated fastener mechanisms for closure of such openings.

A substantially increased demand for front wheel drive cars has brought about a need for protective devices such as boot assemblies for front wheel coupling members. The coupling members are generally of the constant velocity type, and require provisions for uninterrupted lubrication and protection from road elements such as water, salt, and debris. As will be appreciated by those skilled in the art, constant velocity joints are associated with a constant rotational flexing movement. Thus, any protective covering must be designed to accommodate constant flexure without deterioration over the useful life of the coupling member.

Many prior art devices have been employed for protecting universal joints of the type hereindescribed, but have lacked certain desirable features. For example, when such devices are installed as an aftermarket item, it is necessary that the coupling member and associated shafts be at least partially disassembled for installation. Moreover, such devices have not performed satisfactorily, as many prior art devices have been made of materials insufficient to withstand the elements to which they have been subjected. Others have had bodies which have lacked the needed flexibility for the particular application involved.

Finally, where such devices have included openings, the closure mechanisms associated therewith have lacked adequate sealing provisions. Where operating environments have been critical, the sealing systems so employed have permitted leakage of moisture and intrusion of other foreign elements into the coupling member resulting in rapid deterioration and unsatisfactory performance.

SUMMARY OF THE INVENTION

The protective boot assembly as disclosed herein provides an effective protective covering for coupling members designed for connecting angularly disposed rotatable shafts. The boot assembly includes a body portion having an axially extending opening and associated closure mechanism, and is easily applied to shaft coupling members of front wheel drive vehicles without requiring disassembly of the members.

Moreover, the assembly includes a sealing mechanism which is highly effective in prevention of intrusion of moisture and foreign elements during cyclic flexure. As such, the assembly is particularly suitable for use in corrosive environments as encountered in over-the-road motor vehicular service.

In a preferred embodiment the assembly includes a generally cylindrical flexible body defining a longitudinal axis and comprising at least one corrugation disposed in a plane traverse to the axis. The corrugation allows one side of the body to expand and an opposing side to simultaneously contract in response to flexure forces imposed on the body by cyclic movements of the angularly disposed shafts to which the ends of the body are attached. The flexible body includes an axially oriented opening which defines two opposed, axially extending surfaces, whereby a fastener mechanism is supported for closure of the opening. Each of the opposed surfaces is bounded by an external protective lip, whereby closure of the axial opening is effected by the combination of the fastener mechanism and protective lips. Finally, a flexible sealant material is contained within the space between the lips and the fastener mechanism to provide for a virtually hermetic seal.

DESCRIPTION OF A PREFERRED EMBODIMENT

Figure 1:
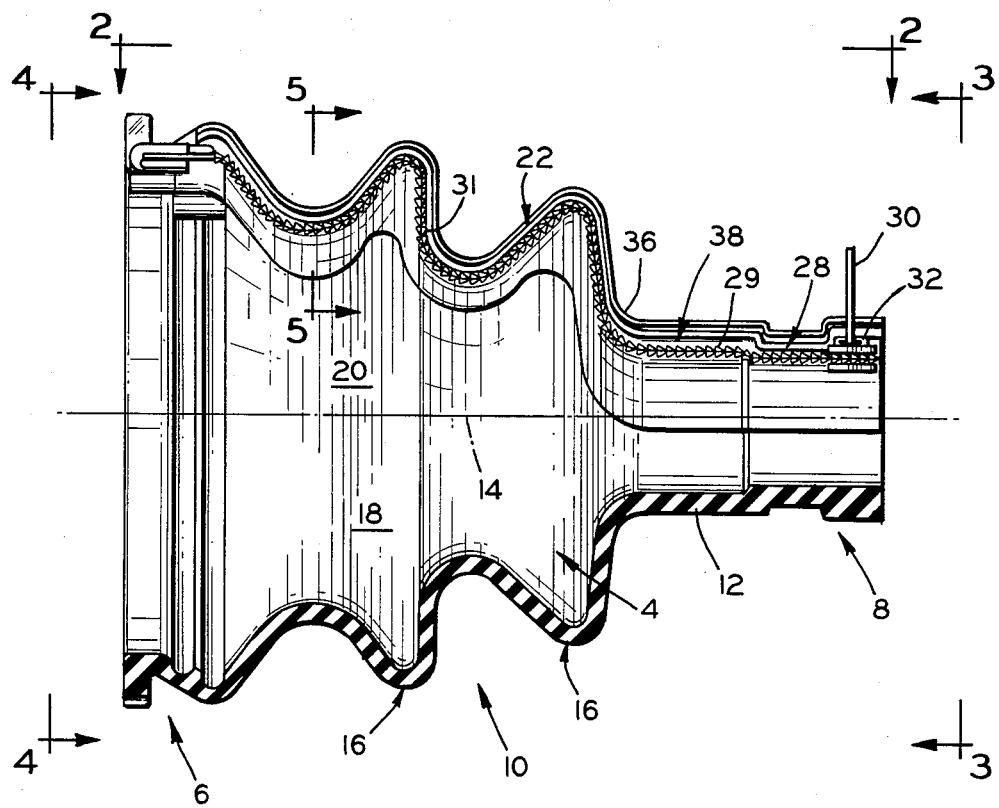
FIG. 1 is a cross sectional side view of the protective boot assembly of the present invention.
Figure 2:
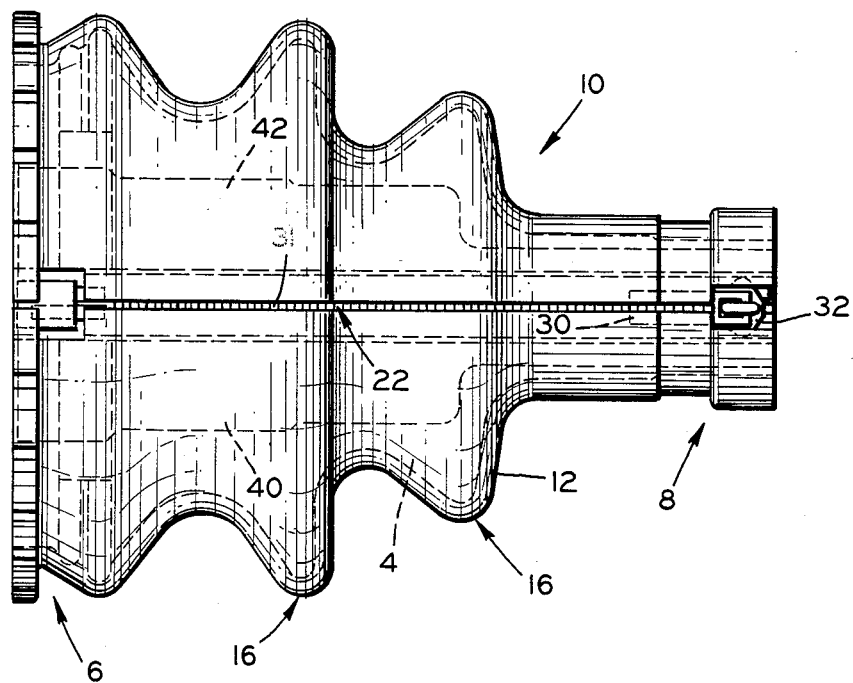
FIG. 2 is a top view along the direction 2—2 of FIG. 1 of the fastener mechanism of the boot assembly.

A preferred embodiment of the protective boot assembly is shown at 10 in FIGS. 1-4. The assembly 10 includes a generally cylindrical flexible body 12 which includes first and second body ends 6 and 8 (FIGS. 1 and 2). The latter ends are disposed for receiving clamps or other connecting devices for support and affixation of the body to a pair of shafts (not shown) which are disposed for rotating angularly with respect to one another. The interior 4 of the body 12 is designed for housing a coupling member, for example a constant velocity universal joint (not shown). The body 12 rotates with the shafts and coupling member in a manner as to accommodate the flexure associated with angularly coupled shafts. As shown, however, the body is in an unstressed state and defines a longitudinal axis 14, about which at least one annular corrugation 16 is disposed in a plane traverse to the axis. In the preferred embodiment, a plurality of corrugations 16 enables the boot assembly 10 to accommodate the rotational flexing motion of a constant velocity coupling member enclosed therein.

The corrugations thus operate to ensure the required flexibility of the protective body 12 about the coupling member during operation of an associated vehicle. Referring to FIG. 1, as was previously suggested, it will now be apparent that the expansion or contraction of the lower portion 18 of the body 12 will be accompanied by an inverse contraction or expansion reaction, respectively, of the upper portion 20 of the body 12.

Figure 3:
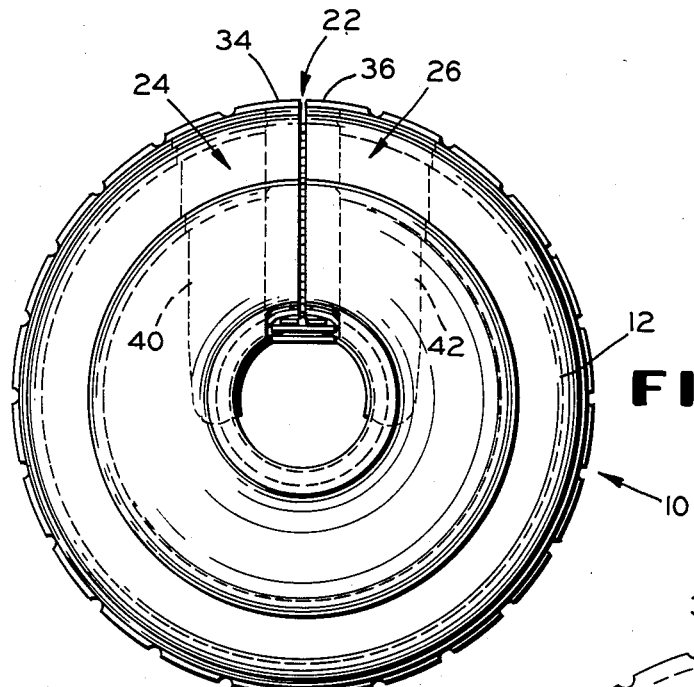
FIG. 3 is an end view of the boot assembly along lines 3—3 of FIG. 1, showing the opposed surfaces and protective lips of the boot assembly of FIGS. 1 and 2.
Figure 4:
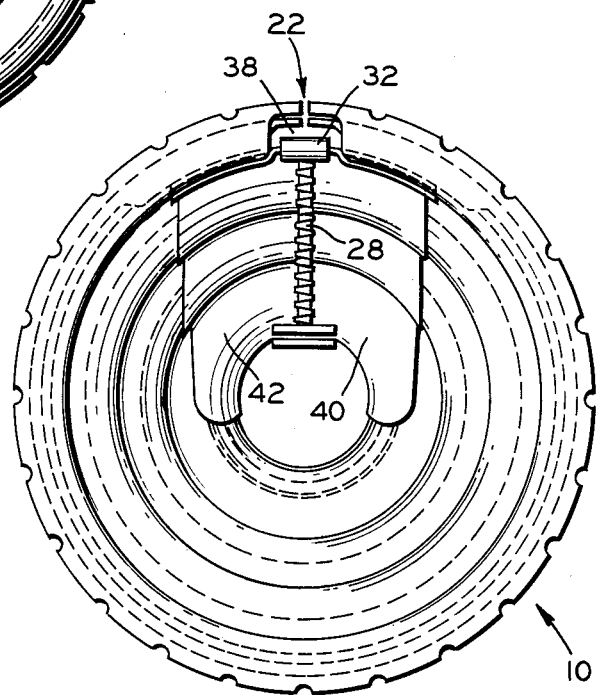
FIG. 4 is an end view of the boot assembly along lines 4—4 of FIG. 1, showing an underside view of the fastener mechanism of FIGS. 1-3.

Referring to FIGS. 2-4, the body 12 includes an axial opening 22, which defines left and right opposed axially extending surfaces 24 and 26. The surfaces are respectively bounded by left and right external protective lips 34 and 36. The surfaces 24 and 26 are disposed for attachment to and support of a fastener member 28

Figure 5:
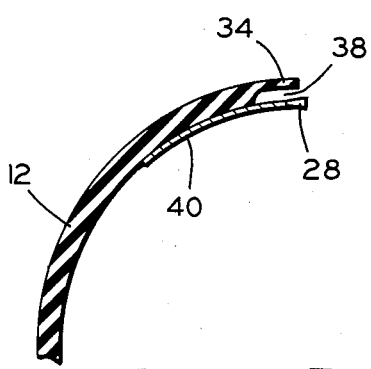
FIG. 5 is a quarter sectional view along lines 5—5 of FIG. 1, showing the interface of the fastener mechanism and protective boot body.

(FIGS. 1 and 4), preferably a zipper mechanism as shown, which includes a shiftable slider 32 having a pull tab 30 (FIGS. 1 and 2). Respective first and second sides 40 and 42 of the fastener mechanism 28 are preferably permanently affixed to the surfaces 24 and 26. For this purpose, the sides 40 and 42 are preferably made of a tough but very flexible fabric. The manner of affixation may be by the use of a bonding adhesive, or alternatively the sides of the fastener mechanism may be bonded by heat and pressure to the body 12 (See also FIG. 5). For the latter accommodation, the flexible body 12 is preferably of an elastomeric material, and is of a premolded configuration in the preferred form shown in FIGS. 1 through 3.

Upon affixation of the fastener mechanism 28 to the premolded elastomeric body 12, the body 12 is adapted for installation and closure over an angular coupling member, such as a constant velocity universal joint. For this purpose, it is desired that clamps (not shown) be affixed over the ends 6 and 8 of the body 12 for fixing the latter ends to the respective coupled shafts. Upon closure of the fastener mechanism 28, the body 12 provides a protective total encasement of the coupling member, and should be sized relative to the coupling in a manner that the coupling never physically contacts the inside walls of the body 12. A major advantage of the protective boot assembly 10 of this invention is the suitability thereof for replacement without necessity of disassembly of the coupling member. Thus the assembly 10 is disposed for simple field installation by virtue of the fastener mechanism 28, which may be conveniently opened for installing the assembly over a constant velocity universal joint, as will be appreciated by those skilled in the art.

Figure 6:
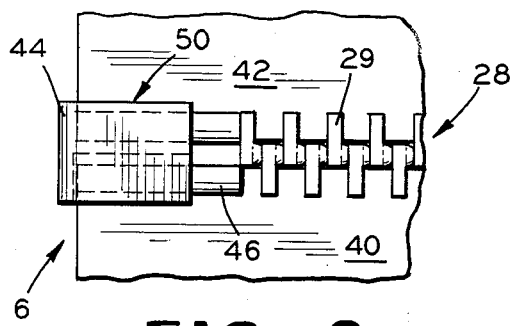
FIG. 6 is a partial view of one end of the fastener mechanism.
Figure 7:
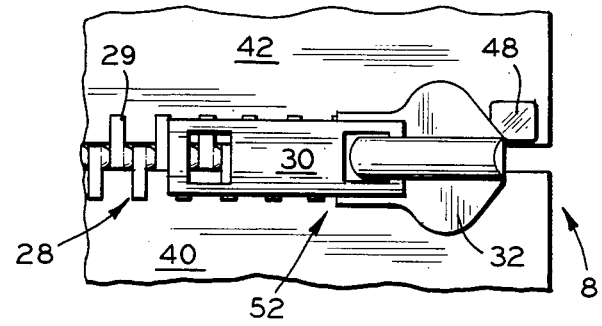
FIG. 7 is a partial view of the opposite end of the fastener mechanism.

Thus, referring to FIGS. 1, 6 and 7, it will be seen that the fastener mechanism 28 provides a closure system which runs the entire axial extent of the boot body 12. A first end 50 of the fastener mechanism 28 is shown in FIG. 6. The end 50 provides the starting mechanism for the fastener at the end 6 of the boot body 12. A typical separating block 44 and associated separating pin 46 are employed for initiation of the closure action as will be fully appreciated. Opposite the first end 50 of the fastener mechanism 28 is a second end 52 which is shown in FIG. 7. The latter end 52 includes a stop 48 for retention of the slider 32 at its extreme closure position. Of course during opening and closure of the boot body 12, the slider 32 and pull tab 30 move the length between ends 50 and 52.

During normal operation of the boot assembly 10, the body 12 continuously undergoes flexing cycles which may tend to open and close the operational elements of the fastener mechanism 28 to admit moisture and other foreign elements. This is particularly problematic whenever the nature of the fastener mechanism is susceptible to permitting such intrusion of foreign elements. In the preferred embodiment the mechanism 28 is a zipper which is, in fact, susceptible to intrusion. It will be clear that in order for the zipper 28 to provide effective closure of the assembly 10, the zipper must be highly flexible and in fact must flex with the body 12 to which it is affixed. As the zipper is flexed, the operational elements of the zipper, the teeth 29, will open and close to objectionably permit moisture and foreign elements into the cavities of the boot body 12, and/or to allow grease or other lubricant to escape.

In order to more effectively seal the zipper or similarly employed fastener mechanism 28, the use of a flexible sealant material is preferred. In the preferred embodiment as disclosed herein, a flexible sealant is applied to a cavity 38 (FIGS. 4 and 5) which is defined by the aforementioned left and right external protective lips 34 and 36 and the external or exposed surface 31 of the fastener mechanism 28. Such a sealant may comprise a room temperature vulcanizing material, as for example a silicone rubber or a flexible epoxy of a rubber base. The sealant can be applied either manually or automatically, preferably by means including a nozzle for directional and locational control of the sealant flow. Thus, the combination of the protective lips, the sealant, and the fastener mechanism provides for a substantially improved sealing system for effective performance of the assembly 10, as will be fully appreciated by those skilled in this art.

As is traditional in this art, coupling members are generally packed in grease, graphite, and/or other lubrication media to ensure a relatively trouble-free operation for long periods of time Some types of coupling members include grease fittings which require periodic service. Rather than attempting to unseal and then to reseal the boot in accordance with the procedure hereinabove detailed, an alternative is to replace the boot with a new one, as this invention now makes field installation quite feasible. This latter approach is in fact preferred. However, the invention hereof would clearly permit the reuse of such a boot if a non-permanent type of sealant is employed; for example, one which may be readily removed and reapplied, as a non-rubber base silicone. In the latter case the slider mechanism 32 would be utilized to either fully or partially open the assembly for provision of additional lubricant or for physical repair of the coupling member.

Finally, in a preferred embodiment the pull tab 30 is designed in a manner such that it will lock into position upon positioning of same to lie flat against the fastener mechanism 28. In this manner it will be seem that a clamp applied to the right end 8 of the assembly 10 will enclose and hold the pull tab 30 down against the mechanism 28. This feature provides added securement of the closure mechanism for what might otherwise be a problem at higher rotational speeds.

What is claimed is:

1. A protective boot assembly comprising a flexible body having a longitudinal axis, said body comprising at least one annular corrugation disposed traversely to said axis, whereby one side of said body may be expanded while an opposing second side is simultaneously contracted in response to flexure forces imposed thereon, said body further including an axial opening defining two opposed, axially extending surfaces, and fastener means affixed to and supported on said surfaces for closure of said axial opening, said fastener means including an axially moveable slider, said body further comprising a pair of external protective lips, said lips being radially spaced from said fastener means, wherein an axially extending external cavity is defined on said body, said cavity being disposed for receiving a flexible sealant material.

2. The boot of claim 1 wherein said flexible body comprises a premolded, elastomeric material.

3. The boot of claim 1 wherein said fastener means is permanently affixed to said opposed, axially extending surfaces by a bonding adhesive.

4. The boot of claim 1 wherein said sealant comprises a room temperature vulcanizing material.

* * * * *